(No Model.)

C. H. R. BOCK & E. M. A. WACKER.
DAMPING DEVICE FOR MUSIC BOXES.

No. 543,286. Patented July 23, 1895.

Witnesses.
Geo. W. Rea.
Robert Everett.

Inventors:
Christian H. R. Bock.
Emil M. A. Wacker.
By James L. Norris.
Atty.

UNITED STATES PATENT OFFICE.

CHRISTIAN HEINRICH RICHARD BOCK AND EMIL MORITZ ANTON WACKER, OF LEIPSIC-GOHLIS, GERMANY.

DAMPING DEVICE FOR MUSIC-BOXES.

SPECIFICATION forming part of Letters Patent No. 543,286, dated July 23, 1895.

Application filed March 23, 1895. Serial No. 542,977. (No model.)

*To all whom it may concern:*

Be it known that we, CHRISTIAN HEINRICH RICHARD BOCK and EMIL MORITZ ANTON WACKER, of Leipsic-Gohlis, Kingdom of Saxony, German Empire, have invented a certain new and useful Improvement in Music-Boxes, of which the following is a clear and exact specification.

Our invention relates to music-boxes or similar mechanical musical instruments, and its object is to provide for an improved construction of the damping devices employed in such music-boxes or mechanical musical instruments.

The means heretofore generally employed for damping the prongs or teeth of the tuned steel comb within the music box or instrument immediately previous to the picking or sounding of the respective prongs or teeth on the part of the usual star-wheels arranged in front of the said prongs or teeth in a well-known manner, consisted of springs or spring-actuated levers, the said springs or levers being usually caused to engage the said steel prongs or teeth either laterally or, in other cases, in the same direction as that in which the teeth of the star-wheels engage the said prongs or teeth of the steel comb. One grave objection to this class of damping device is this: that, upon the resiliency of the spring becoming diminished or ceasing altogether in the course of time, the action of the said device will become very unreliable or it may fail entirely.

In order to remove this and other objections, our invention consists in a damping device formed in the shape of and arranged as a lever, having a positive movement imparted to it in a manner to be more fully hereinafter described, the construction and arrangement being such as to render the use of springs unnecessary.

Figure 1:
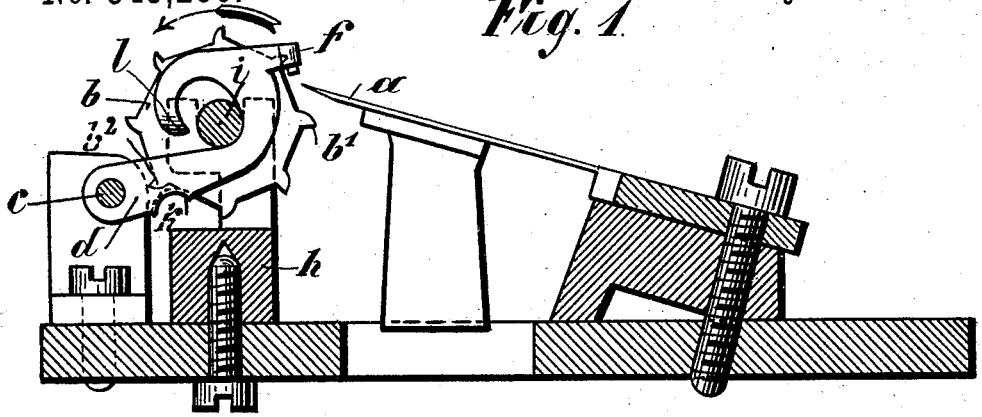
Figure 2:
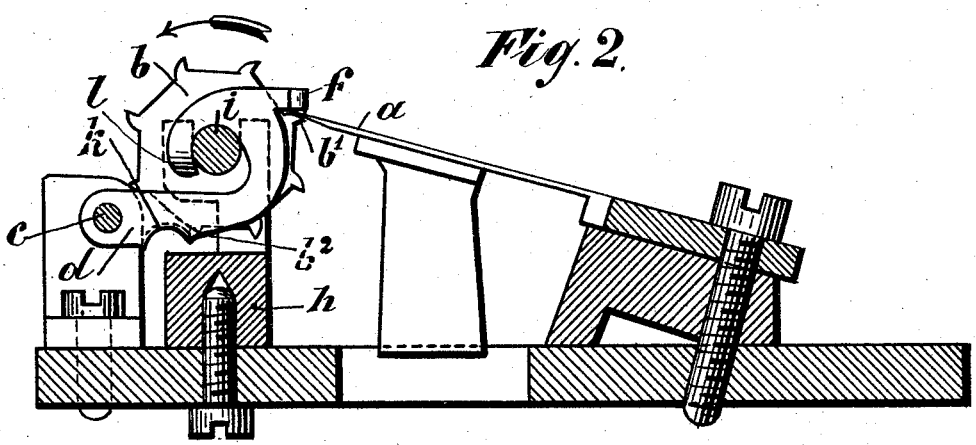
Figure 3:
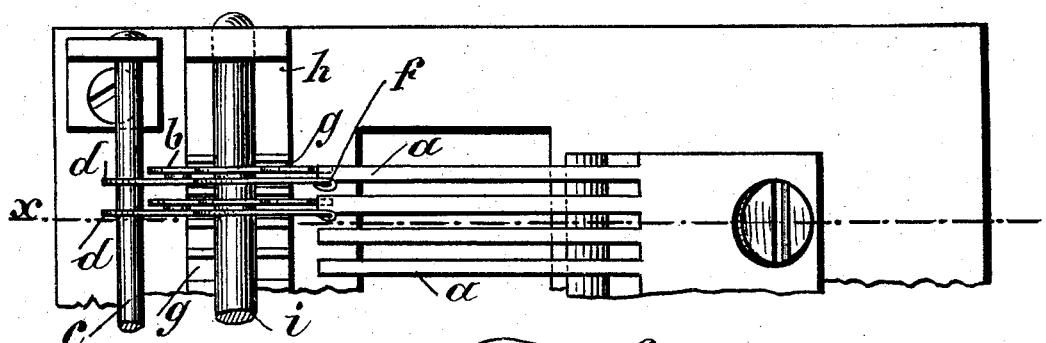
Figure 4:
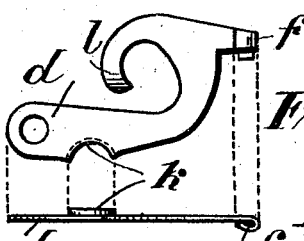

In the accompanying drawings, illustrating our invention, Figures 1 and 2 are vertical sections on the line $x$ of Fig. 3, showing the damping device in different positions; and Fig. 3 is a plan view, all these figures showing a sufficient portion of the well-known interior mechanism of a music-box to render the operation and arrangement of the damping device connected therewith properly understood. Fig. 4 is a detail showing the principal part of the damping device in lateral and top view.

$a$ designates the prongs of the tuned steel comb and $b$ the star-wheels for sounding the said prongs by engagement therewith, upon the said wheels being, in the usual and well-known manner, rotated in the direction of the arrow by well-known means, such as music-sheets or plates passing above the said star-wheels, and thereby engaging the teeth of the said wheels by means of small projections provided on the said music-sheets or plates.

The damping device consists of a lever $d$, preferably formed as shown in Fig. 4 of the drawings. A number of these levers—one for each star-wheel $b$—are pivoted on a common fulcrum $c$ provided in the rear of the star-wheels $b$, each lever extending along one side of its respective star-wheel toward the front thereof and beyond the axis $i$ common to all the star-wheels, a curved portion of each lever partly surrounding the said axis and thus acting to limit the extent of downward movement of the lever. The free end $f$ of each lever $d$ projects immediately above the point of the corresponding prong $a$ and has preferably attached to it in any suitable manner a pad of india-rubber or other soft material. At a suitable point between its pivotal point $c$ and its free end $f$ each lever $d$ is provided with a laterally-projecting lug or portion $k$, adapted to be engaged during the rotation of the wheel $b$ by the teeth of the latter, in a manner to be more fully hereinafter described. Each star-wheel and its corresponding lever $d$ are movable within a slot $g$, a corresponding number of such slots being provided in the block $h$, through which the common axis $i$ of all the wheels $b$ is passed in the manner shown. The curved portion $l$ of the lever $d$ may be slightly bent in a lateral direction to bear against the adjacent star-wheel $b$, so as to produce a certain frictional effect tending to prevent the lever from dropping into its lower position from the position shown in Fig. 1.

The operation of the improved damping device is as follows: Upon the star-wheels $b$ being rotated in the direction of the arrow, the lever $d$, normally held in the position shown in Fig. 1 by the friction of the curved portion $l$ against star-wheel $b$, is caused to move downward into the position shown in Fig. 2, and thus to engage with its padded end $f$ the respective prong $a$ of the steel comb to damp it or keep it from sounding, this downward movement being effected by a tooth, such as $b^2$ of the star-wheel, acting against the lug or projection $k$ of the lever $d$, and thereby pressing the latter downward. This downward movement takes place immediately before another tooth, such as $b'$ of the star-wheel, engages the said prong. It will thus be seen that the padded end of the damping-lever $d$ and the tooth $b'$ of the wheel are moved in opposite directions and engage the prong $a$ from opposite sides. As the wheel $b$ continues to rotate, the prong of the steel comb is released by the tooth $b'$ and thereby sounded. At the same time the tooth $b^2$ has left the lug or portion $k$, thus permitting the lever to remain in its lifted position, into which it has in the meantime been raised again by the prong $a$, under the action of the tooth $b'$, bearing against the said prong from below and lifting it sufficiently to permit of the prong being released and sounded.

Besides the advantage that the employment of springs is rendered entirely unnecessary in the improved construction described, the latter possesses the additional advantage that, by reason of the prongs being engaged from opposite sides, they are very securely held between the two active parts, and by this means a very prompt and efficient damping action is obtained.

Having thus fully described our invention, what we desire to claim, and secure by Letters Patent, is—

1. In a music box having a tuned comb and wheels with radial projections to temporarily engage and sound the prongs of the said comb, a lever or levers, each having a laterally projecting lug or portion extending into the line of movement of the wheel projections and each extending with its free end, to a point near a prong of the comb and opposite to that side thereof on which the prong is engaged by the projections of the said wheel, substantially as and for the purpose set forth.

2. The combination, with a steel comb and a wheel adapted with its projections to engage the prongs of the said comb, of a lever, having a laterally projecting lug or portion extending into the line of movement of the wheel projections, a part on the free end of the said lever extending to a point near a prong of the comb and opposite to that side thereof on which the prong is engaged by the wheel projections, substantially as and for the purpose set forth.

3. The damping lever $d$ having the lateral comb projection $k$, the projecting portion $f$ and the curved and laterally bent portion $l$.

In testimony whereof we have signed our names to this specification in the presence of two subscribing witnesses.

CHRISTIAN HEINRICH RICHARD ROCK.
EMIL MORITZ ANTON WACKER.

Witnesses:
RUDOLPH FRICKE,
OTTO DOEDERLEIN.